United States Patent [19]

Carcia et al.

[11] Patent Number: 4,486,087
[45] Date of Patent: Dec. 4, 1984

[54] METHOD OF AND APPARATUS FOR ALTERING SENSITIVITY OF PHOTOMETER TO DIFFERENT SCENE PORTIONS

[75] Inventors: Peter P. Carcia, Reading; Richard J. Coppa, Westwood, both of Mass.

[73] Assignee: Polaroid Corporation, Cambridge, Mass.

[21] Appl. No.: 481,587

[22] Filed: Apr. 4, 1983

[51] Int. Cl.³ ............................................ G03B 7/08
[52] U.S. Cl. .................................. 354/434; 354/481
[58] Field of Search ................ 354/481, 289.1, 434

[56] References Cited

U.S. PATENT DOCUMENTS

| | | | |
|---|---|---|---|
| 3,000,281 | 9/1961 | Rentschler | 95/10 |
| 3,406,294 | 10/1968 | Swarofsky | 250/237 |
| 3,511,142 | 5/1970 | Biber | 95/10 |
| 3,529,523 | 9/1970 | Haskell | 95/10 |
| 4,173,400 | 11/1979 | Faramarzpour | 354/27 |
| 4,180,312 | 12/1979 | Schmidt et al. | 354/481 X |
| 4,188,104 | 2/1980 | Uchiyama et al. | 354/31 |
| 4,214,826 | 7/1980 | Uchida et al. | 354/31 |
| 4,285,583 | 8/1981 | Canter | 354/23 D |
| 4,285,584 | 8/1981 | Canter | 354/31 |
| 4,306,787 | 12/1981 | Fukuhara et al. | 354/31 |
| 4,309,090 | 1/1982 | Yamada | 354/31 |
| 4,309,091 | 1/1982 | Fukuhara et al. | 354/31 |

OTHER PUBLICATIONS

"What Do Through-Lens Meters Really Measure??", pp. 78-82, by H. Kimata and K. Werner (unable to locate magazine title or date published).

Primary Examiner—Michael L. Gellner
Attorney, Agent, or Firm—Leslie J. Payne

[57] ABSTRACT

There are disclosed method of and apparatus for evaluating radiation in the scene. The evaluating apparatus includes a photoresponsive arrangement having a given angular directional response and a plurality of lenses respectively mounted for movement between a first position in optically operative alignment with the photosensitive arrangement for altering the given angular directional response thereof, and a second position out of the operative alignment.

7 Claims, 5 Drawing Figures

METHOD OF AND APPARATUS FOR ALTERING SENSITIVITY OF PHOTOMETER TO DIFFERENT SCENE PORTIONS

BACKGROUND OF THE INVENTION

This invention relates, in general, to a method of and apparatus for selectively changing the sensitivity of a photometer to different portions of a scene, as well as indicating which sensitivity preference is being used.

Automatic exposure control systems are well-known in the photographic arts. Typically, such systems include a photometer having a photoresponsive transducer and a lens element or system. The lens system receives scene radiation from a preselected area of the scene to be photographed and directs it onto the transducer's photosensitive surface. The corresponding transducer output signal may be utilized to predict a photographic exposure condition or actually control the closing of an automatic shutter mechanism at an appropriate film exposure condition. Most of the exposure control systems used in the prior art employ a single photocell. Use of a single cell photometer, however, presents certain drawbacks. This is because they react to the average scene brightness of a field to be photographed. Unfortunately, the average scene or field brightness usually differs from the brightness of selected zones of photographic interest. For instance, central or lower zones of the field have been found to be more representative of the brightness of the subject. Thus, when the brightness of the peripheral or upper field zone contrasts with the brightness of central or lower field zones, an incorrect exposure for the more important subject normally occupying the center or lower zones results. Consider, for example, a backlit scene where the illumination level of the subject of principal interest is much lower than the illumination level of the background. One common picture taking situation which exhibits backlighting is when the sun is in the background behind the subject. In these instances, such automatic exposure control systems set exposure for the higher background illumination. As a result, the subject of principal interest is underexposed.

Further, consider a forelit scene. This may occur where the subject is brightly illuminated by sunlight, or an artificial light source, while the areas around the subject exhibit subdued illumination because of shadows or a dark colored light absorbing background. Obviously, difficulties arise if the photometer is configured to take an average brightness reading.

To correct for the noted drawbacks several proposals have been put forward. One has been to alter the aiming of the photometer lens system so that it evaluates scene radiation from different scene zones or portions. This is typically done in photographic systems having distinct exposure modes, for example, systems having distinct flash and ambient modes. Examples of such photocell aiming altering devices are shown in the following U.S. Pat. Nos. 3,511,142; 3,529,523 and 4,173,400. These systems are also limited because such changes are responsive only to the presence or absence of a flash device.

Another proposal is to use a multi-photocell array. U.S. Pat. Nos.: 3,511,142; 3,529,523 and 4,188,104; 4,214,826; 4,285,583; 4,285,584; 4,306,787; 4,309,090 and 4,309,091 disclose photometric devices using an array of photocells arranged so that under certain conditions, each photocell receives light from a preselected portion of the entire scene. One limitation of some of these systems besides cost is that they compare the light level reading of the center portion of the scene with readings from the sides and top and bottom of the scene based on the assumption that the subject of principal interest will be centered in the viewfinder. In many instances the assumption will be valid. However, many times it will not be valid in that the subject of principal interest may well be located about the periphery of the scene boundary. In such instances an erroneous conclusion will be reached by the logic as to the classification of scene lighting conditions and more likely than not the subject of principal interest will be either over or underexposed.

In U.S. Pat. No. 3,406,294 there is disclosed a light exposure meter having means to adjust the acceptance angle of the scene radiation impinging upon a photocell. The system is rather complicated because it includes a plurality of light tubes through which light passes before impinging on the photocell. The angular orientation of these tubes is adjustable by moving a sleeve in a direction parallel to the axis of the system. In this manner, the outer ends of the tubes are moved relative to each other. Besides being relatively complicated, the system only changes the angle of light acceptance and not the directional response characteristics of the photometer.

U.S. Pat. No. 3,000,281 discloses an automatic setting device for a photographic camera in which a rotatable disc having a plurality of different size apertures therein may be rotated so that selective ones of the apertures can control the amount of scene radiation striking the photocell.

None of the known prior art can control exposure by allowing the operator a great degree of versatility in changing the sensitivity including the angular directional response in a reliable and compact manner let alone automatically in response to scene lighting conditions. Additionally, none make provision for the foregoing while also making provision for conveniently indicating the altered directional response characteristics of the photometer.

SUMMARY OF THE INVENTION

In accordance with the present invention there is provided a photographic apparatus comprising means for mounting image recording material at a focal plane; and means for directing radiation from a photographic scene along a given path to the focal plane to produce an exposure of recording material located thereat. Included in such apparatus for evaluating radiation in the scene is means including a photoresponsive arrangement having a given angular directional response and a plurality of lenses. The lenses are respectively mounted for movement between a first position in optically operative alignment with the photosensitive arrangement for altering the given angular directional response thereof, and a second position out of the operative alignment.

In one preferred embodiment, the lenses are circumferentially mounted in a rotatably mounted wheel for movement between the first and second positions.

In another embodiment, there is included means for evaluating and comparing radiation in different portions of the scene, and means responsive to such comparison for automatically moving at least a selected one of the lenses to the first position to thereby provide an angular directional response of the photoresponsive arrangement in accordance with the comparative evaluation.

According to the present invention, there is a method of automatically selecting and altering the photoresponsiveness of a photoresponsive device. Included are the steps of sensing scene radiation incident on a plurality of photoresponsive regions. Each of the regions is operable to sense radiation from preselected portions or areas of a scene to be evaluated. Other steps include evaluating and comparing the sensed scene radiation for selecting at least one of a plurality of optical systems which systems can be brought into and out of operative relationship with the regions so that when the selected one is in operative relationship to the regions, the sensitivity to scene radiation from different regions is altered, and driving the selected one of the optical systems into operative relationship with the regions.

Among the other objects and features of the present invention is the provision of an improved apparatus for evaluating scene radiation wherein the angular directional response characteristics of the photoresponsive means can be altered; the provision of a manually movable device which can alter the directional response characteristics in accordance with the desires of a user; the provision of an apparatus wherein the sensitivity of the apparatus to different portions of the scene can be changed automatically; the provision of automatically changing the response characteristics in accordance with the prevailing scene lighting conditions; the provision of means for indicating which photoresponsive arrangement is operative; and a method for automatically selecting and setting a particular lens system for a photoresponsive device in accordance with the scene lighting condition.

Other objects and further scope of applicability of the present invention will become apparent from the detailed description to follow when taken in conjunction with the accompanying drawings in which like parts are designated by like reference numerals.

DETAILED DESCRIPTION

Figure 1:
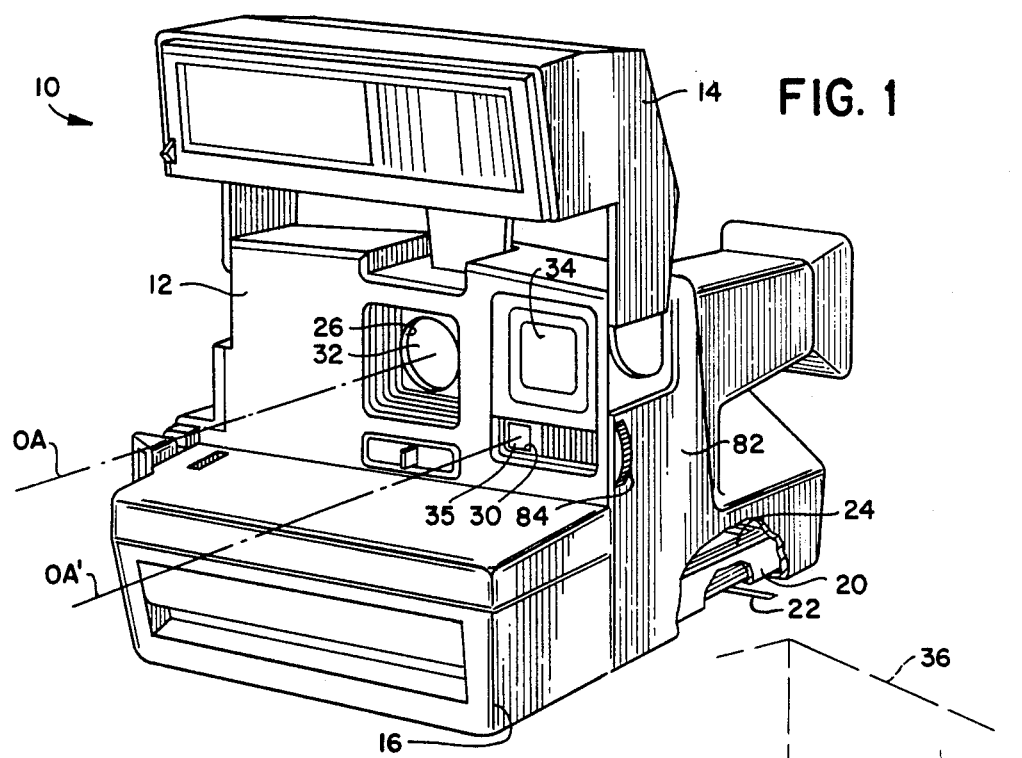
FIG. 1 is a perspective view, partly in section, showing a photographic apparatus of the self-developing type employing the present invention.
Figure 3:
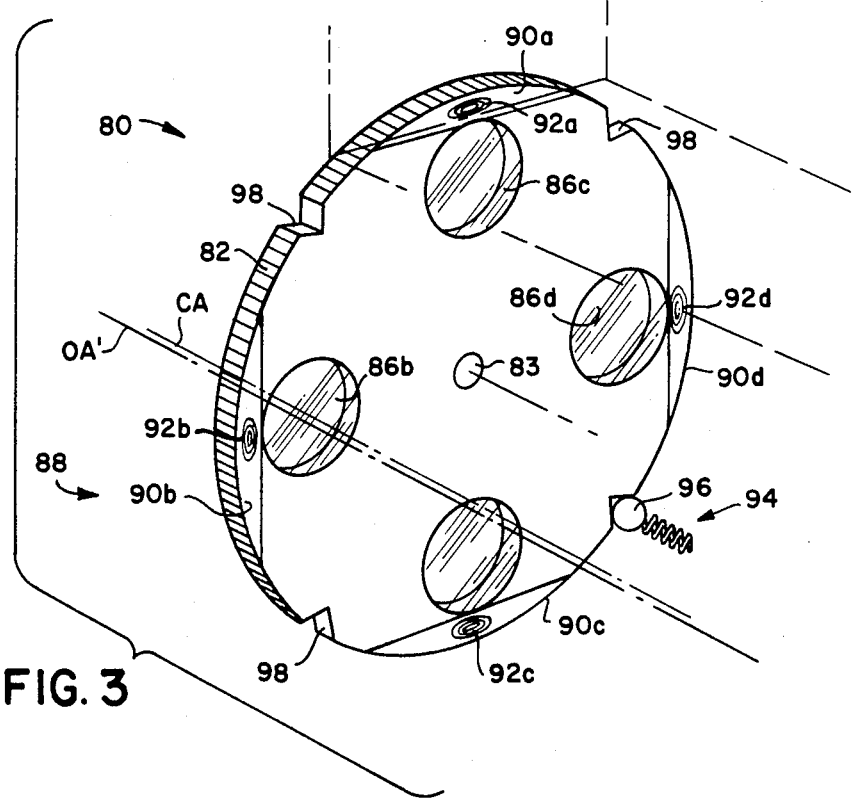
FIG. 3 is an enlarged perspective view showing certain components of the present invention.
Figure 2:
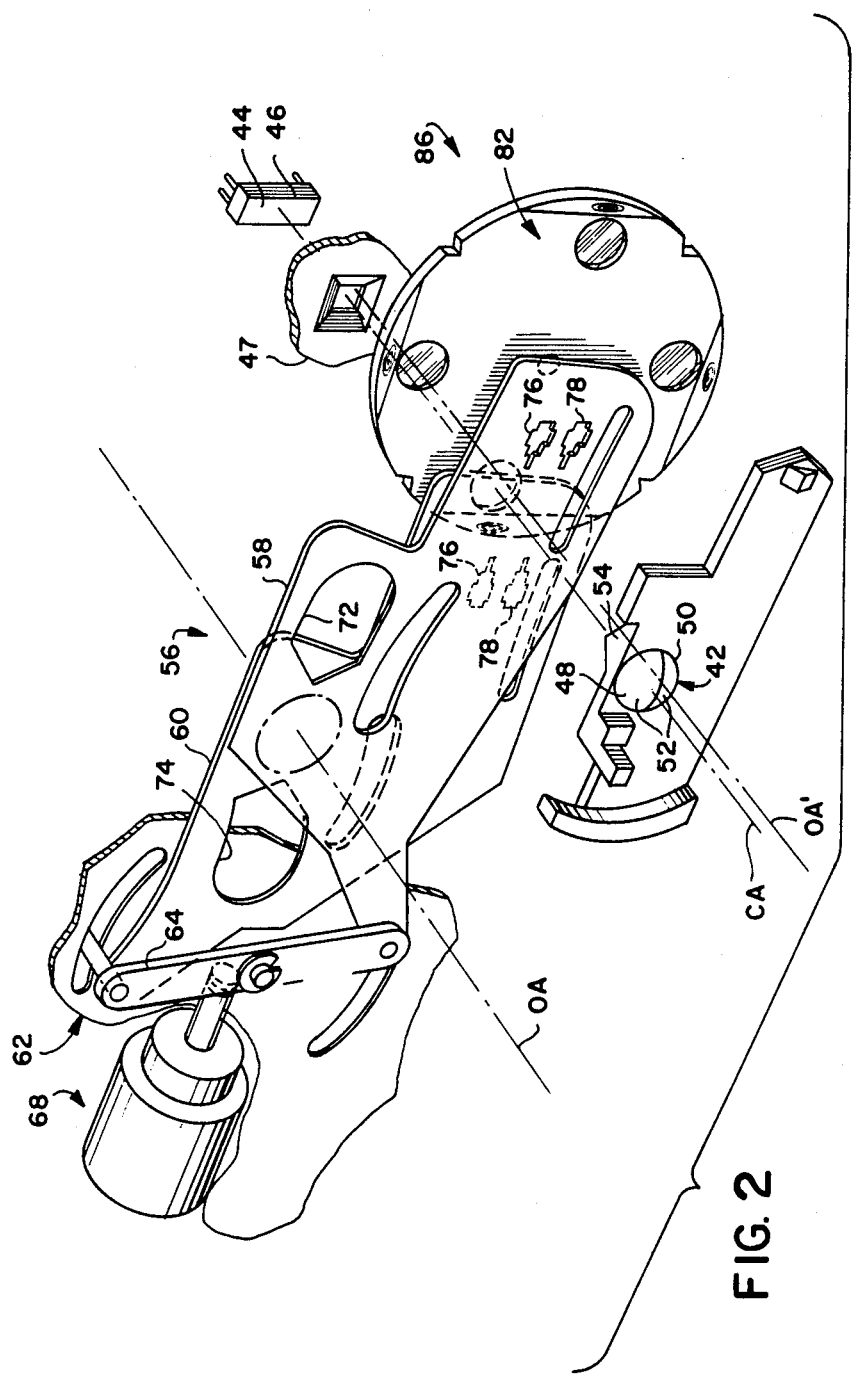
FIG. 2 is a perspective view showing an exposure control system embodying one embodiment of the acceptance angle adjusting mechanism of the present invention.

Reference is made to FIGS. 1-3 for showing one embodiment of the present invention. This embodiment is directed to an approach for allowing manual adjustment of the specific acceptance angle of a photometer for use in an exposure control system of a photographic apparatus 10 of the self-developing type. The photographic apparatus 10 is of a type which uses self-processable film. It is to be understood that the present invention is not limited to use with such types of photographic apparatus. Rather, the present invention contemplates that it may be used in other types of image recordable apparatus.

As best seen in FIG. 1, the photographic apparatus 10 includes a rigid camera body or housing 12 having pivotally mounted thereon an electronic flash unit 14. The flash unit 14 is manually movable between an erect position, such as illustrated in FIG. 1, and a folded or inoperative portion (not shown). In the latter position, the flash unit 14 covers a significant portion of the front surface of the camera housing 12. In this embodiment, the camera housing 12 has a generally prismatic shape. Included in the housing 12 is a generally rectangularly shaped film loading door 16. The door 16 is shown in a latched or closed position. When unlatched, it can move to an open position (not shown). In this latter position, access to the camera housing interior 18 is provided for a film pack 20. Details of the film pack 20 do not, per se, form an aspect of the present invention. For greater detail of such a film pack, however, reference is made to commonly-assigned U.S. Pat. No. 3,872,487. Releasably stored within the film pack 20 are film units 22 of the type generally described in commonly-assigned U.S. Pat. Nos. 3,415,644 and 3,594,165. As noted, these film units 22 are of the self-processable type. Referring back to the film pack 20, it has a housing with a generally rectangular aperture 24. The film pack aperture 24 aids in defining the field of view of the subject which will be recorded during exposure. Each of the film units 22 is mounted so as to be placed in successive registration with and biased towards the aperture 24 by a biasing element (not shown). The topmost film unit 22 is positioned at the focal plane. Beneath the stacked array of film units 22 is a thin battery which is electrically coupled, in a well-known manner, to the various electrical systems of the camera.

Formed in the front wall of the housing 12 are the taking, viewfinder and photocell apertures designated generally at 26, 28 and 30; respectively. Mounted in registration with the taking lens aperture 26 is an objective taking lens 32 which is positioned forwardly of an aperture (not shown) formed in an opaque exposure chamber (not shown) formed in the housing 12. Located in this exposure chamber is a generally trapezoidal-shaped mirror, also not shown, which is arranged at a predetermined angle with respect to the optical axis OA and the film plane. This mirror, in essence, provides a folded light path between the image forming scene rays being directed by the objective taking lens 32 and the uppermost one of the film units held at the focal plane.

Mounted in registration with the viewfinder aperture 28 is a negative lens 34 which forms part of a reversed Galilean viewfinder that is structured, in a well-known manner to have its view substantially coextensive with that of the taking lens. Included in the viewfinding system is a viewfinding tunnel a part of which is diagrammatically indicated by reference numeral 36 (FIG. 2).

Located beneath the viewfinder aperture 28 is the photocell aperture 30. The aperture 30 has a window 35 that is aligned with the entrance to a hood (not shown). Both the photocell window 35 and the hood are arranged along an optical axis $OA^1$ and assist in defining a path which allows scene radiation into the interior of the camera housing and directs it to the exposure control system 40.

Reference is now made to FIGS. 2 and 3 for better illustrating the improved exposure control system 40 made in accordance with the present invention. Many components of the exposure control system 40 do not, per se, form an aspect of the present invention. Hence, only those details necessary for an understanding of the present invention will be set forth. In this connection, reference is made to commonly-assigned U.S. Pat. No. 4,345,828 for more information relating to such a system. As best shown in FIG. 2, there is located behind the optical element 42 a pair of photodetectors 44, 46. Preferably, the photodetectors or cells 44, 46 are of the type described in commonly-assigned U.S. Pat. No. 4,358,186. The photodetectors, for purposes of manufacturing convenience, may be manufactured on a single substrate held in apertured wall segment 47. The axes of both of the photodetectors 44, 46 are generally centered about the optical axis CA of the optical element 42, which is offset from the optical axis $OA^1$. The photodetectors 44, 46 can be connected electrically to an exposure control circuit (not shown) forming part of the exposure control system 40 for purposes of controlling photographic functions, such as the termination of exposure in a well-known manner. Each of the photodetectors 44, 46 provides an electrical output signal which varies in accordance with the amount of scene radiation incident thereon. The mounted photodetectors 44, 46 are spaced behind the optical element 42 by a distance which is generally equal to its focal length. It should be pointed out that although the present embodiment discloses use of a pair of photodetectors the present invention contemplates that a single photodetector can be used in this embodiment as well.

Referring back to the optical element 42, it is mounted on and supported by an interior wall (not shown) of the camera housing 12. Essentially, the element 42 comprises upper and lower segments 48 and 50; respectively. These segments 48, 50 do not, per se, form an aspect of the present invention. For more details of their construction, function and operation, reference is made to commonly-assigned U.S. Pat. No. 4,345,828. Each of these symmetrically formed lens segments 48, 50 collects scene radiation from the scene and directs such to each of the photodetectors 44, 46; respectively. The lens segments 48, 50 provide for specific acceptance angles for the photodetectors 44, 46; respectively. Briefly, each of the upper and lower segments 48, 50 includes a generally convex surface 52 with a spherical shape and having opposed thereto a rear prism-like conformation 54. The prism conformations are mounted to be optically aligned with the photodetectors for purposes of converging scene radiation to the latter. The upper and lower optical lens segments 48, 50 provide for different spectral filtering. More particularly, the upper lens segment 48 provides spectral filtering so that spectral frequencies in the visible range (e.g., 400–700 nm) are transmitted, while spectral frequencies in the near infrared IR region (e.g., 700–1200 nm) are blocked. On the other hand, the lower lens segment 50 operates conversely to the upper segment with respect to its spectral filtering functions. That is, the lower lens segment 50 transmits frequencies in the near infrared range while excluding or blocking frequencies in the noted visible spectrum.

The exposure control system 40 includes a blade mechanism 56 which functions to selectively block and unblock the optical path to the photodetectors 44, 46 as well as selectively block and unblock scene light from the taking lens 32 to successive ones of the film units 22. Details of this blade mechanism 56 do not form an aspect of the present invention. Hence, only a brief description thereof will be set forth. For a more detailed description of such a blade mechanism, reference is made to commonly-assigned U.S. Pat. No. 4,345,828.

As best shown in FIG. 2, the blade mechanism is comprised of a pair of overlapping, opaque, scanning shutter type blades 58, 60. Each blade 58, 60 is reciprocally driven by a common pivoting walking beam mechanism 62. The walking beam mechanism 62 includes a pivotally mounted walking beam 64 to which the blades 58, 60 are pinned in a well-known manner to a block casting 66 attached to the interior of the camera body. Attached to the walking beam 64 is a solenoid assembly 68 which drives the blades 58, 60 to the blocking position as illustrated in FIG. 3 when energized. When the solenoid assembly 68 is de-energized, a biasing spring (not shown) serves to drive the blades 58, 60 to their unblocking position (not shown). The blades 58, 60 are normally held in the blocking position against the bias of the spring by a known mechanical shutter latching device (not shown), but better described in the commonly-assigned U.S. Pat. No. 4,040,072.

The shutter blades 58, 60 have primary apertures 72, 74; respectively. The primary apertures 72, 74 serve to progressively overlap with each other such that they coincide with respect to the optical path of the taking lens. These primary apertures 72, 74 define the effective aperture value.

Provided in each of the blades 58, 60 is a pair of upper and lower secondary photocell apertures 76, 78; respectively. The secondary apertures 76, 78 permit scene light to simultaneously impinge upon the pair of photodetectors 44, 46 in correspondence with the scene light admitted to the film unit 22 during movement of the blades 58, 60 during the exposure cycle of the camera. In particular, the upper secondary apertures 76 progressively coincide in overlying relationship to the photodetector 44, while the lower secondary apertures 78 progressively coincide in overlying relationship to the photodetector 46. In this regard, simultaneously with enlarging primary aperture values, the secondary photocell apertures define a corresponding progressively enlarging secondary effective aperture over the photocells 44, 46. As noted, the photocell output signals can be directed to an integration circuit (not shown) forming part of the exposure control circuit. Operation of the exposure control system is set forth in U.S. Patent No. 4,358,186.

Reference is now made to the manual adjusting mechanism 80 of this embodiment. It includes a lens wheel 82 rotatably mounted on a stub shaft 83 protruding from an internal housing wall (not shown). As best seen in FIG. 1, the lens wheel 82 has a portion 84 protruding sufficiently from the side wall of the housing 12 to allow a user to manually grasp and rotate it. In this manner, individual ones of the desired lenses can be positioned in the optical path of the photodetectors 44, 46. The lens wheel 82 includes a plurality of different optical systems or lenses 86a–d which are circumferentially spaced about the wheel. Each of the lenses 86a–d is optically different from the others and alters the angular directional response provided by the lens segments 48, 50 for the scene radiation impinging on the photodetectors 44, 46. It should be noted that the angular directional response is a single parameter which provides a user with information of a photometer's directional response characteristics as well as acceptance angle. A specific acceptance angle can be derived from the angular directional response curve. American National Standard General-Purpose Photographic Exposure Meters, PH 2.12, 4.2.3, defines the specific acceptance angle as "the angle in the stated directions from the optical axis of the receiver at which a point source must be placed to reduce the scale reading of the meter an amount corresponding to 50 percent of the original light reading when the same source was on the optical axis." It will be readily apparent that a photometer with a narrow specific acceptance angle say on the order of a few degrees would be classified as a "spot meter" convenient for measuring brightness of individual scene objects. On the other hand, a meter having a specific acceptance angle equivalent to, for instance, one-half of a camera's field angle would be considered more as an "averaging" meter. This is important because it indicates how much importance will be placed on various scene objects in predicting exposures. Thus, the lenses 86a–d alter the sensitivity of the photometer to different portions, zones or areas of the scene. Although the lenses 86a–d modify the angular directional response of the photometer, the lenses 86a–d could in fact replace the optical element 42. Also the lenses 86a–d could change the aiming of the photometer so as to change sensitivity thereof to different scene portions.

The lens 86a essentially provides a specific acceptance angle which would modify the acceptance angle of the optical element 42 so that the resultant specific acceptance angle would be considered a spot meter. Thus, the photometer would be sensitive to the brightness of individual scene objects located, for instance, in the center of the field of view. This would provide better exposure control for backlit scenes. The lens 84b provides a specific acceptance angle which would modify that of the photometer so that the resultant cooperation would be characterized as fairly broad so that no one object dominates. This lens would normally be used in an overall evenly lit scene. In this manner, a better exposure is maintained because it includes as much of the scene as possible. For horizontal landscape scenes in which the bright sky might tend to cause underexposure of the ground, the lens 86c alters the specific acceptance angle of the photometer so that they are more sensitive to scene radiation from the lower or ground portion of the scene. On the other hand, the lens 86d alters the directional response of the photometer so that they are generally more sensitive to scene radiation from the central to upper portions of the scene; such as would occur in beach scene lighting conditions. Although this embodiment depicts four such lens systems 86a–d, it will be appreciated that any suitable number may be provided.

This embodiment also includes indicia means 88 for automatically indicating which one of the lenses 86a–d is positioned over the photodetectors by reason of graphical pattern lines of the sensitivity pattern of the photometer as modified by the lenses 86a–d. In this regard, the lens wheel 82 is provided with a plurality of visual indicating assemblies 90a–d. These assemblies 90a–d independently register with the viewfinding tunnel 36. Each of the indicating assemblies 90a–d may be comprised of a plurality of transparent plastic segments 91 connected to the lens wheel 82. Each of the segments 91 have thereon visible indicia 92a–d serving to indicate the directional response characteristics of the particular lens positioned over the photodetectors. The present embodiment contemplates that each of the visible indicia 92a–d be comprised of a plurality of sensitivity patterns or rings. The size and configuration of the patterns serve to indicate the angular directional response of the photometer as modified by the lenses 86a–d.

The present invention contemplates, of course, that other visual indicia may be provided on the transparent segments 91 so as to indicate which lens is being used or what the specific acceptance angle is being used. The lens wheel 82 need not have the indicating assemblies 90 formed thereon. Instead, the lens wheel 82 could have visual indicators spaced on the wheel which are visible when the wheel protrudes from the housing. In this latter instance, indicia visible on the protruding wheel portion would be offset, by 90 degrees, from the lens which such indicia correlates to. Of course, the present invention contemplates provision for electronic means (not shown) to be used for automatically visually displaying or audibly indicating which lens is in overlying relationship to the photodetectors or the type of sensitivity of the photometer.

In this embodiment, there is provided a detenting mechanism 94 schematically illustrated in FIG. 3. It includes a spring-biased ball 96 which releasably cooperates with V-shaped notches 98 formed on the periphery of the lens wheel. Of course, other detenting mechanisms (not shown) can be provided for use in releasably restraining the wheel in desired positions.

Operation of the photometer sensitivity adjusting mechanism 80 of the present invention is believed obvious from the foregoing description.

Figure 4:
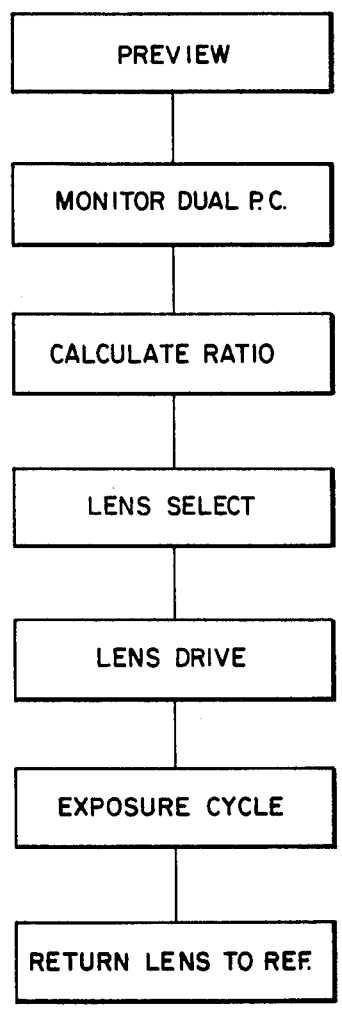
FIG. 4 is a flowchart showing the sequence of operations of a second embodiment of the present invention; and, FIG. 5 is a block diagram of the second embodiment.
Figure 5:
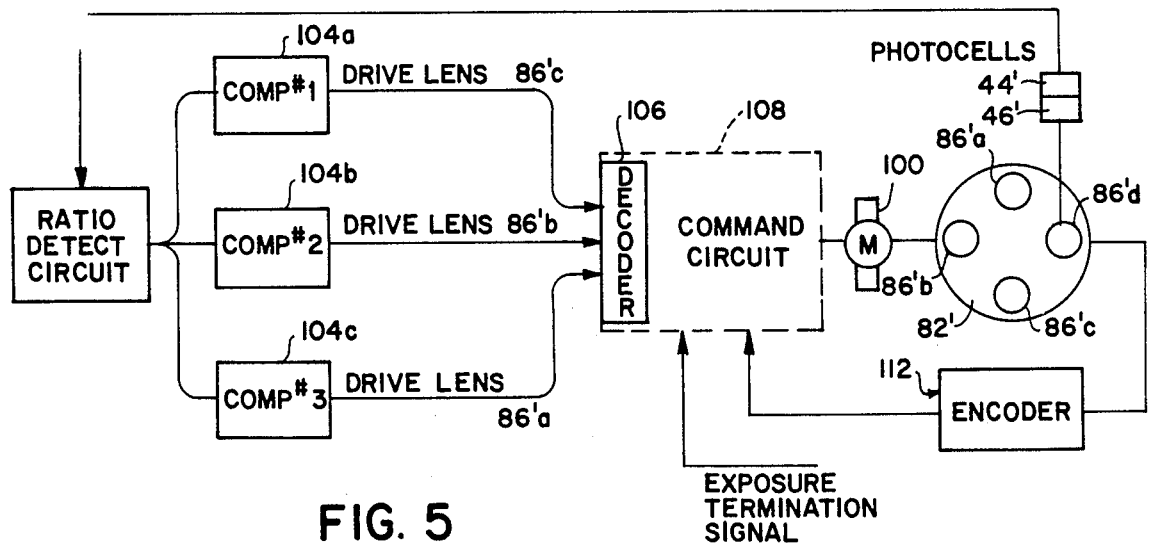

Reference is now made to FIGS. 4 and 5 for demonstrating another preferred embodiment of the present invention. It differs from the preceding insofar as the selecting and setting of the sensitivity of the photometer to be used during exposure are accomplished automatically and in response to prevailing scene lighting conditions.

The steps of selecting the proper specific acceptance angle are performed during a previewing period. This occurs usually at the commencement of an evaluation period prior to exposure. The evaluation period would commence following actuation of a photographic cycle.

For selecting the angular directional response in accordance with the prevailing scene lighting conditions, the present invention contemplates scene radiation being evaluated from different scene portions and then compared to each other. For instance, determinations as to whether a scene is backlit or frontlit can be made.

Towards the end of evaluating scene radiation from different scene portions, this embodiment employs a pair of vertically arranged photodetectors 44', 46'. These photodetectors function similarly to the photodetectors of the previous embodiment. However, these photodetectors 44', 46' are arranged so that they will receive scene radiation generally from the upper and lower halves of the scene; respectively. In this embodiment, the photodetectors 44', 46' and their associated circuitry are used twice. In the first instance during a previewing period for a prescribed time period following actuation of the photographic cycle for selecting the desired photometer lens to be used during exposure and then for controlling exposure in accordance with the type of control described in commonly-assigned U.S. Pat. No. 4,345,828.

For insuring uniformity of scene radiation evaluation during the previewing period, the lens wheel 82' has a reference lens 86'd. In this embodiment, the lens wheel 82' is arranged such that the lens 86'd is normally positioned over the photodetectors 44', 46' at the beginning of each preview period. As will be explained later, after lens selection is completed, the lens wheel 82' is rotatably driven so that one of the lenses 86'a-c is placed in overlying relationship to the photodetectors 44', 46' during the exposure portion of the evaluation period. At the termination of exposure, the lens wheel 82' is rotatably driven back to its original position. In this embodiment, it is done by a rotary stepper motor 100. When driven backwardly, the reference lens 84'd resumes its original position at the beginning of the preview period. The rotary stepper motor 100 is of the type disclosed in commonly-assigned U.S. Pat. No. 4,325,614. As such, it is able to drive in both directions.

While the reference lens 86'd is in its overlying relationship, the photodiodes 44', 46' will produce signals representative of the time integration of scene radiation incident thereon during the preview period. It will be apparent that the photocell apertures (not shown) of the shutter blades must be enlarged so that scene radiation can strike both the photodetectors before the shutter blades commence displacement from their blocking position, such as shown in FIG. 2, to their unblocking position. In this regard, the photodetectors 44', 46' become operative at the beginning of each photographic cycle for measuring the scene radiation during preview. The signals from the photodetectors 44', 46' during the preview period are transmitted to the ratio detect circuit generally indicated by reference numeral 102. The ratio detect circuit 102 is operative to define a ratio signal which is representative of the ratio of the signal of the upper photodetector 44' (i.e., upper portion of the scene) relative to the signal of the lower photodetector 46' (i.e., lower portion of the scene). Although not shown, an analog-to-digital converter can be used to change the analog ratio detect signal to a digital signal. This ratio detect signal would then be simultaneously transmitted to a plurality of digital comparators 104a,b,c. These comparators serve to compare the ratio detect signal with their respective reference signals. In this manner, each is operative to provide either a high or low binary output signal. These binary outputs from the comparators 104a,b,c will be transmitted to a decoder 106 within a command circuit 108. The decoder 106 will translate the combination of binary signals from the comparators 104a,b,c into a single output signal which represents the combination of signals from the comparators. Each of the comparators 104a,b,c is responsive to the ratio detect signal and one, for example, will provide a high (binary logic 1) output signal, while the others will produce low (binary logic 0) output signals. The decoder 106, in turn, will be operative to cause the command circuit to drive the stepper motor 100 so that one of the desired lenses 86'a-c, corresponding to the comparator issuing the high binary code, is placed in overlying relationship to the photodetectors 44', 46'. For instance, if the ratio detect signal is fed to the comparator 104a and the difference between the ratio signal and the reference value of this comparator is greater than zero, for example, such comparator will issue a high binary code output signal to the decoder 106 of the command circuit 108. The comparators 104b,c will issue low binary code output signals to the decoder 106. The decoder 106 will cause the drive command circuit 108, responsive to the input of the comparator 104a, to drive the rotary stepper motor 100 so that the lens wheel 82' rotates until the lens 86'c is in the desired overlying position. The lens 86'c would, for example, modify the angular directional response as did lens 86c. In this embodiment, a high binary code issuing only from the comparator 104b would cause the drive command circuit 108 to drive the rotary stepper motor 100 until the lens 86'b is placed in overlying relationship. A high binary code from comparator 104c would cause the lens 86'a to be placed in overlying relationship.

Towards the end of insuring that the lens selected is correctly positioned, an encoding system 112 is provided. The encoding system 112 can be an optical type such as disclosed in commonly-assigned U.S. Pat. No. 4,317,624. In this case, the lens wheel 82' would have slots (not shown). These slots would cooperate with an LED (not shown) and a photocell (not shown) to provide a feedback signal to the drive command circuit 108. In this manner, the selected drive signal of the command circuit 108 will cease when the appropriate feedback signal matches it.

Whatever lens 86'a-c is selected though, it will remain in overlying relationship to the photodetectors 44', 46' until termination of exposure. Thus, the exposure is more accurate since the specific acceptance angle is intended to compensate for different scene lighting conditions. Of course, after preview, the photodetectors 44', 46' will be de-energized. A first light detect circuit not shown would be used for re-energizing the photodetectors for measuring the time integration of scene radiation intensity incident thereon for controlling exposure during the following exposure period of the overall evaluation period. At the termination of exposure, the system is operative to cause the rotary stepper motor 100 to drive the lens wheel 82' back to its original position; shown in FIG. 4. The photographic apparatus will, of course, function in the manner indicated in U.S. Pat. No. 4,345,828 to process the exposed film and eject the latter from the camera housing.

It will be noticed that in this embodiment, there is no indicia means provided for automatically indicating which lens is being used. However, it should be emphasized that the present invention contemplates use of any suitable indicating system that would indicate automatically to a user which lens is being employed for exposure. For instance, LED's or LCD's or a combination thereof may be used.

It is believed operation of this particular embodiment is evident from the foregoing description of its components.

Since certain changes may be made in the above-described method and apparatus without departing from the scope of the invention herein involved, it is intended that all matter contained in the description or shown in the accompanying drawings shall be interpreted as illustrative and not in a limiting sense.

What is claimed is:

1. Photographic apparatus comprising:
   means for mounting image recording material at a focal plane;
   means for directing radiation from a photographic scene along a given path to the focal plane to produce an exposure of recording material located thereat;
   means for evaluating radiation in the scene, said evaluating means including a photoresponsive arrangement having a given angular directional response and a plurality of lenses respectively mounted for movement between a first position in optically operative alignment with said photosensitive arrangement for altering the given angular directional response thereof, and a second position out of said operative alignment;

means responsive to said evaluating means for controlling the amount of radiation directed from the scene to the focal plane so as to provide a selected exposure of said recording material and, including means for evaluating and comparing radiation in different areas of the scene, and means responsive to such comparison for automatically moving a selected one of said lenses to said first position to thereby provide an angular directional response of said photoresponsive arrangement in accordance with said comparative evaluation.

2. Apparatus for evaluating scene radiation from a scene which is usable in an image recording device having means for mounting image recording material at a focal plane and for directing radiation of the scene to the focal plane; and means responsive to scene evaluation of the apparatus for controlling a function of the image recording device the apparatus includes:

photoresponsive means having at least a photoresponsive region;

a plurality of optical systems, each one of said systems possesses characteristics such that when at least one of said systems is in operative relationship with said region, said photoresponsive means is more sensitive to scene radiation from portions of the scene different than when other of said systems are in operative relationship to said region;

means operable for permitting movement of selected ones of said optical systems into and out of operative relationship with said region and, a plurality of photoresponsive regions each of which receives radiation from generally different scene portions and selected ones of optical systems being capable of being in operative relationship to said regions; each of said photoresponsive regions generating a signal responsive to scene radiation incident thereon from its respective scene portion; means responsive to said signals for evaluating and comparing them and based on the comparison for selecting at least one of said optical systems which would provide a predetermined sensitivity to scene radiation from at least a selected portion of the scene for the photoresponsive means; and means responsive to said evaluating and comparing means for driving said selected one of said optical system into operative relationship to said regions 3. The apparatus claim 2 wherein said evaluating and comparing means include a ratio detect circuit which is responsive to said photoresponsive means to define a ratio singal which is representative of the ratio of the signal between one of said photoresponsive regions and another one of the photoresponsive region; and a comparator circuit which includes comparators responsive each to the ratio signal and a command circuit which is responsive to said comparators to provide a command signal to selectively drive said drive means so that the preselected one of said system is in operative relationship.

4. The apparatus of claim 2 wherein said selected ones of said optical systems when in said operative relationship change the angular directional response of said photoresponsive means.

5. The apparatus of claim 4 wherein each of said optical systems when in operative relationship with said region changes at least the vertical and/or horizontal directional response of said photoresponsive means.

6. The apparatus of claim 2 further including means for using indicia for facilitating identification by the user of which of said selected ones of said optical systems is in operative relationship with said region.

7. A method of automatically selecting and altering the photoresponsiveness of a photoresponsive device which is usable for controlling scene radiation comprising the steps of:

sensing scene radiation incident on a plurality of photoresponsive regions, each of the regions being operable to sense radiation from preselected portions of a scene to be evaluated;

evaluating and comparing the sensed scene radiation for selecting at least one of a plurality of optical systems which systems can be brought into and out of operative relationship with said regions so that when the selected one is in operative relationship to the regions, the sensitivity to scene radiation from different regions is altered; and, driving the selected one of said optical system into operative relationship with said regions.

* * * * *